United States Patent [19]

Peterson

[11] Patent Number: 4,710,073
[45] Date of Patent: Dec. 1, 1987

[54] TOOL APPARATUS FOR BORING A HOLE

[75] Inventor: Richard L. Peterson, Plymouth, Minn.

[73] Assignee: Infinity Boring Tool Company, Minneapolis, Minn.

[21] Appl. No.: 859,718

[22] Filed: May 5, 1986

[51] Int. Cl.[4] .......................................... B23B 29/034
[52] U.S. Cl. .................................... 408/181; 408/185; 408/197
[58] Field of Search ............... 408/181, 147, 184, 185, 408/197

[56] References Cited

U.S. PATENT DOCUMENTS

| | | | |
|---|---|---|---|
| 2,452,828 | 11/1948 | Bell | 408/185 |
| 3,635,572 | 1/1972 | Robinson | 408/181 |
| 3,704,958 | 12/1972 | Gulibon et al. | 408/181 X |
| 3,801,213 | 4/1974 | Eversole | 408/185 X |
| 4,006,995 | 2/1977 | Gruner | 408/185 X |
| 4,551,044 | 11/1985 | Schultschik | 408/185 |

FOREIGN PATENT DOCUMENTS

| | | | |
|---|---|---|---|
| 1627012 | 8/1978 | Fed. Rep. of Germany | 408/181 |
| 572782 | 2/1976 | Switzerland | 408/181 |

Primary Examiner—Z. R. Bilinsky
Assistant Examiner—Glenn L. Webb
Attorney, Agent, or Firm—Merchant, Gould, Smith, Edell, Welter & Schmidt

[57] ABSTRACT

The present invention is directed to a boring head tool apparatus. A new method of making the tool as well as structure which allows use of the indicated method and leads to several advantages combine to overcome problems of the art to increase boring accuracy to at least 0.0001 inch. The tool includes a slide which is moved with respect to the body of a primary member using a differential screw technique. The differential screw is located within the dovetail, while the tensioning screw is located beneath the dovetail.

2 Claims, 11 Drawing Figures

TOOL APPARATUS FOR BORING A HOLE

FIELD OF THE INVENTION

The present invention is directed to high precision, boring head tools. The present tool has a shank at one end for being held by a rotational power source and includes means for receiving a cutting bar at the other end so that on rotation, a hole is bored. A hole may also be bored by holding the tool stationary and rotating the piece part.

BACKGROUND OF THE INVENTION

High tolerance dimensioning is specified in the manufacture of items in many industries. Tolerances to a mil (0.001 inch) or so have been common for many years. More precise tolerances have been more difficult to achieve. The present invention is directed to a device for consistently boring holes at tolerances less than a tenth of a mil (0.0001 inch), an accuracy unachievable by boring previously.

The present invention allows for manufacture of the tool by a new process which results in a more precisely fabricated tool which in turn results in improved accuracy and precision of the tool. To appreciate the significance of the present invention, it is appropriate to consider a prior art boring head.

Figures 1, 2:
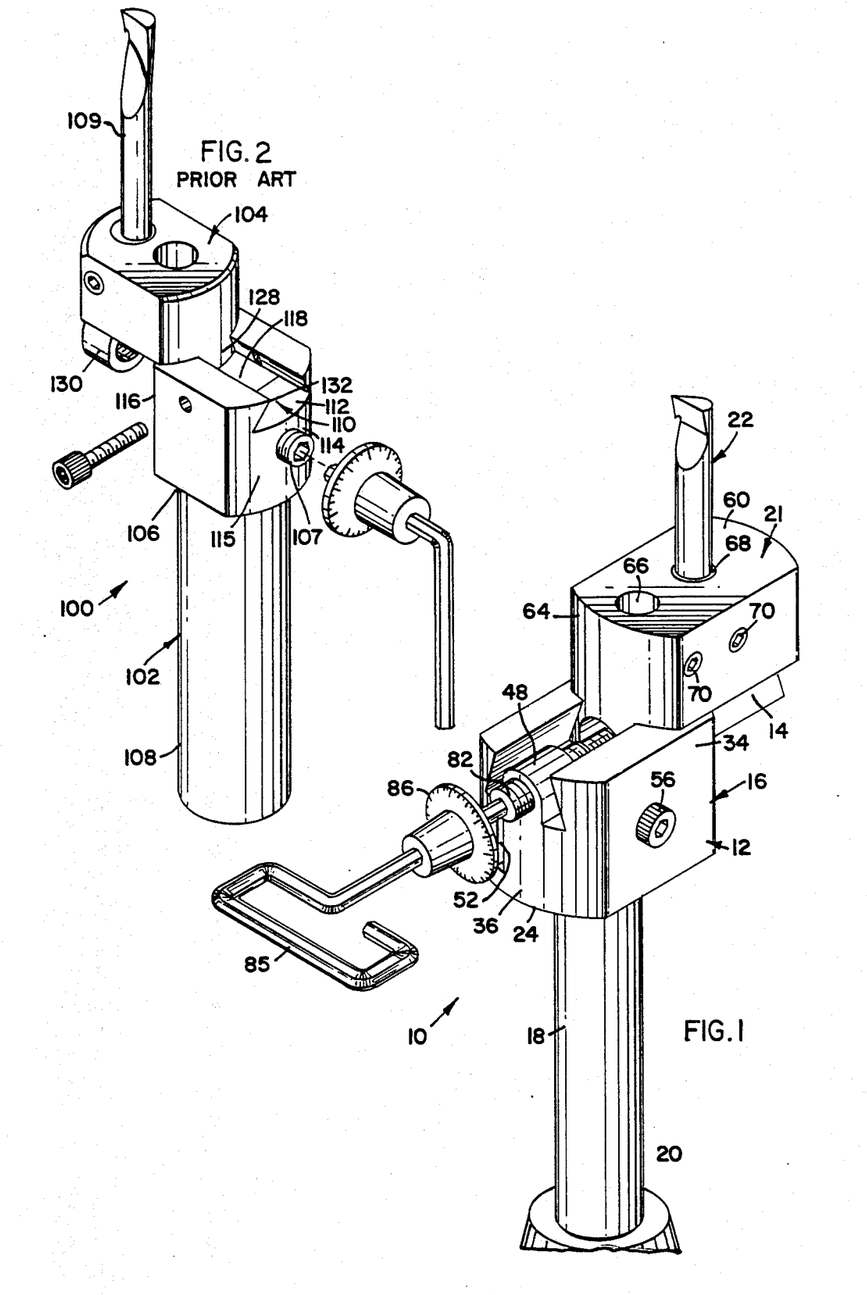
FIG. 1 is a perspective view of apparatus in accordance with the present invention.
FIG. 2 is a perspective view of prior art apparatus.

A prior boring head 100 is shown in FIG. 2. Boring head 100 includes a primary member 102 and a slide 104. Primary member 102 comprises a body 106 and a shaft 108 extending from a first end of the body 106. Boring head 100 includes a differential screw 107 for moving slide 104 with respect to primary member 102. Differential screw 107 has a first set of threads with a first pitch at one end and a second set of threads with a second pitch at the other end. The first set of threads is threaded into end wall 115 of body 106 and the second set of threads is threaded into guide 130 of slide 104. On turning screw 107, slide 104 moves with respect to head 106 a distance equal to the difference of the pitches of the two sets of threads. Thus, cutting bar 109 held by slide 104 may be moved quite accurately with respect to the axis of shaft 102.

Figure 10:
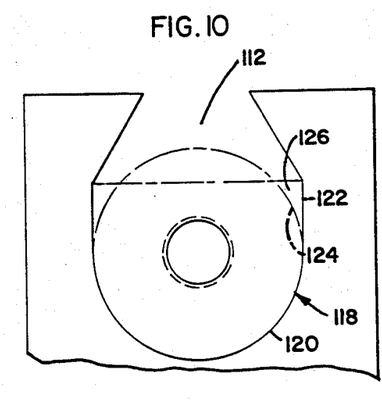
FIG. 10 is an end view of a prior art first blank illustrating the procedure for making the prior art boring head of FIG. 2.

A channel 110 is formed in the second end of body 106. Channel 110 is formed as a dovetail 112 which extends between opposite sides 114 and 116 and is further formed to include a partial, secondary portion 118 beneath dovetail 112. Secondary portion 118 extends inwardly from second side 116, but does not extend all the way to first side 114. Consequently, the portion of side 114 beneath dovetail 112 forms an end wall 115 for secondary portion 118. Secondary portion 118 has a cross-sectional shape, as indicated in FIG. 10, comprising a semi-cylindrical bottom 120 with an axis spaced from the bottom of dovetail 112. The sides 122 of secondary portion 118 are perpendicular to the bottom of dovetail 112 and tangent to semi-cylindrical bottom 120.

To fabricate channel 110, a hole is drilled with a flat bottom bit to form the semi-cylindrical bottom 120 and a temporary, semi-cylindrical upper side shown by broken line 124. The hole extends from second side 116 to a distance spaced from first side 114. Next, dovetail 112 is formed. This leaves trangular cross-sectional portions 126 bordered by portions of side 124, the bottom of dovetail 112 and yet to be formed sides 122. Portions 126 must be removed but are very difficult to remove. Typically, an end mill is used; however, the tool must be long and usually bends during the milling process. Walls 122 often end up having taper and often too, the sidewalls of dovetail 112 near the bottom of dovetail 112 are cut into. The result is that the dovetail walls and walls 122 do not provide a close fit with guides 128, 130.

Figure 11:
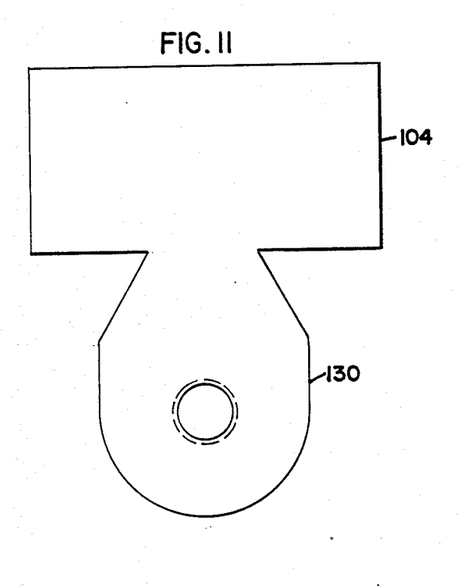
FIG. 11 is an end view of a prior art second blank illustrating the procedure for making a slide in accordance with the prior art boring head of FIG. 2.

Slide 104 includes a dovetail male guide 128 at one end and a secondary portion male guide 130 at the other end. Differential screw 107 is threaded into end wall 115 on one side and into secondary portion male guide 130 on the other side. Dovetail guide 128 serves as a stabilizing element.

Screw 132 extends between opposite walls of dovetail 112 between guides 128 and 130 and functions to keep body 106 rigid and to compress the walls the channel 110 against guides 128, 130.

During fabrication of head 100, after primary member 102 and slide 104 are machined, both are heat treated to enhance hardness.

A number of problems prevent the prior art boring head 100 from realizing consistent accuracy. As indicated previously, the milling of triangle 126 frequently leads to taper in walls 122. In addition, since heat treating typically results in warpage, the necessity of machining before heat treating requires correcting for any warpage to the degree possible. Hand lapping of various surfaces of both primary member 102 and slide 104 is often required. This precludes interchangeability of parts. Although the hand lapping improves mating between the slide and the head, it does not eliminate regions of slight interference. Consequently, the slide does not move smoothly during final adjustment with respect to the head, but often jumps and skips causing errors in adjustment of 0.0002 to 0.0004 inches. In addition to the nonuniform (tapered and warped) mating sides of channel 110 and guides 128 and 130, the distance between the differential screw and the outermost corners 132 of the dovetail 112 leads to a torque effect and adds to any binding problem, thereby also increasing inconsistency of adjustment and dial readings.

The problem presented by the prior art is how to move the differential screw closer to the outer dovetail corners to reduce torque during adjustment without weakening either the screw or the dovetail sidewalls, both of which are known high stress elements during boring or adjustment. Inherent in the design problem is how to eliminate the taper and warpage occurring in the mating surfaces of the head and slide during fabrication.

SUMMARY OF THE INVENTION

The present invention solves the problems of the prior art. The present invention is directed to tool apparatus for holding a cutting bar for boring a hole. The apparatus comprises a primary member including a body with an outer first end and a mating second end. The primary member also includes a shank extending away from the outer first end of the body. The apparatus further includes a slide member having an outer third end and a mating fourth end. The slide member includes in the outer third end a mechanism for receiving the cutting bar. One of the primary member and the slide member includes in one of the mating second and fourth mating ends, respectively, a channel extending between opposite sides of said one member. The channel has a bottom and opposite first and second side walls. A partial wall protrudes into the channel and is attached to the one member in which the channel is formed. The other of the primary member and the slide member in the other of the mating second and fourth ends, respectively, includes a guide for fitting into the channel. The apparatus further includes means for adjustably sliding the guide along the channel thereby controllably moving the slide member with respect to the body. The adjustable sliding mechanism is located within the channel and extends between the partial wall and the guide. The appartus still further includes a mechanism for applying by each of the first and second side walls of the channel a compressive force against the guide. The force applying mechanism is located between the bottom of the channel and the outer end of the member in which the channel is formed.

In a preferred embodiment, the channel is located in the body of the primary member, while the guide is a part of the slide member.

The present invention is also directed to a method for making the just described tool apparatus. The method comprises the steps of making the primary member, making the slide, fitting the guide of the slide into the channel of the primary member, threading a threaded rod into threaded openings in each of the guide and the partial wall rising above the channel, and threading a tension applying screw into a threaded opening beneath the bottom of the channel for the purpose of causing the side walls of the channel to apply compressive force against the guide.

The method for making the primary member comprises the steps of drilling a first hole in the first side of a first blank to a location spaced from the second side thereby leaving a partial wall. Next, a first slot is milled in the second end of the first blank. The first slot is aligned on and extends along the first hole from the first side of the blank to the partial wall. Next, a second hole is drilled and tapped in the partial wall. The second hole has a centerline which defines an axis. Next, a third hole is drilled to extend between the third and fourth sides of the first blank and is located between the first bottom of the first slot and the first end of the body when the body is fully formed in the first blank. A portion of the third hole is tapped. After completing the steps mentioned thus far, the first blank is heat treated. After heat treating, a dovetail channel is formed in the second end of the first blank, preferably using a wire electro-discharge machine. The channel has a second bottom no deeper than the first bottom of the first slot. The channel forming step includes cutting a second slot in the bottom of the channel on one side of the partial wall. The second slot extends in the direction of the first end to a location on the first end side of the third hole. Finally, a cylindrical shank is ground along the end portion of the first blank opposite the second end. The first end divides the shank from the body.

The method for making the slide comprises the steps of drilling partially into the second blank a clearance fourth hole. The fourth hole is drilled in the sixth side near the third end. Next, a third slot is milled in the third end from the sixth side to the end of the fourth hole. The third slot extends to the diameter of the fourth hole, the diameter being approximately parallel to the third end. Next, a fifth hole is drilled and tapped. The fifth hole is aligned with the axis of the second hole when the slide and the body are completed and fitted together. Next, a mechanism for receiving the cutting bar is machined in the fourth end of the second blank. After completing the above mentioned steps, the second blank is heat treated. After heat treating, a guide is formed in the third end, preferably with a wire electro-discharge machine. The guide mates closely in the channel of the body. After making the primary member and the slide as described, the items are fitted together and the threaded rod and screw mentioned hereinbefore are installed.

The problems of the prior art are overcome by the present invention. As indicated, the preferred process uses a wire electro-discharge machine wherein the part is fixtured and moved through a predetermined path across a continuous wire which is charged electrically and washed continuously with a chemical which enhances the cutting ability of the wire. The electro-discharge machine may be used after heat treating and, in fact, is the only economical method of machining accurately after heat treating. As a consequence, noncritical and rather simple maching steps may be done before heat treating, while critical surfaces may be formed by the electro-discharge machine after heat treating. This procedure eliminates the problem of warpage of critical surfaces. Furthermore, because the electro-discharge machine holds very close tolerances, the dovetail channel has very flat and precisely dimensioned surfaces. This results in an interchangeable fit between slide parts and body parts. Any hand lapping and unique matching of a slide to a body is eliminated. Still further, the elimination of any cutting into the dovetail side by a long end mill tool is eliminated so that the amount of contact surface between the dovetail and the dovetail guide is increased thereby reducing tool "chatter" in heavy bore cuts. Thus, a particular advantage of the present structure is the elimination of all barriers in the body and the slide so that a continuous path may be followed to machine the critical surfaces with the electro-discharge machine.

In addition, the present configuration yields further advantages. In particular, the mechanism for moving the slide with respect to the body is located almost centrally with respect to the dovetail channel in the body and the dovetail guide of the slide. Such location tends to minimize any torquing and any irregular sliding, which was a problem with the prior art. Such location, since the part simply leaves more metal in place than the prior art boring head for example, also makes it much less likely that any internal forces in the metal part will cause any unwanted deformation. Even though the moving mechanism is located in the dovetail channel, however, there is still a mechanism for making the channel sidewalls rigid and compressing them against the dovetail guide. Such mechanism is still possible due to the slot extending beneath the bottom of the dovetail channel and the screw extending through the slot to hold and compress portions of the body on either side of the slot.

Thus, the present invention overcomes the problems of the prior art and also realizes further advantages. Of most importance, any errors in adjustment of the present invention are less than 0.0001 inch, an accuracy generally more than 100% better than the prior art. Although the machine which drives the present tool may now become a limiting factor with respect to boring accuracy, with the prior art it is the boring head which limits accuracy when used in combination with high precision machines.

These and further advantages and objects of the present invention may be better understood by reference to the following drawings and the detailed descriptive matter thereafter wherein a preferred embodiment of the invention is illustrated and described.

DETAILED DESCRIPTION OF THE PREFERRED EMBODIMENT

Referring now to the drawings wherein like reference numerals designate identical or corresponding parts throughout the several views, and referring more particularly to FIG. 1, tool apparatus in accordance with the present invention is designated generally by the numeral 10. Apparatus 10 includes a primary member 12 and a slide member 14. Primary member 12 has a body 16 with a shank 18 extending away therefrom for being held by a rotational power source 20 or by a stationary holding mechanism. Slide member 14 mates with body 16 and includes a mechanism 21 for holding a cutting bar 22.

Figure 3:
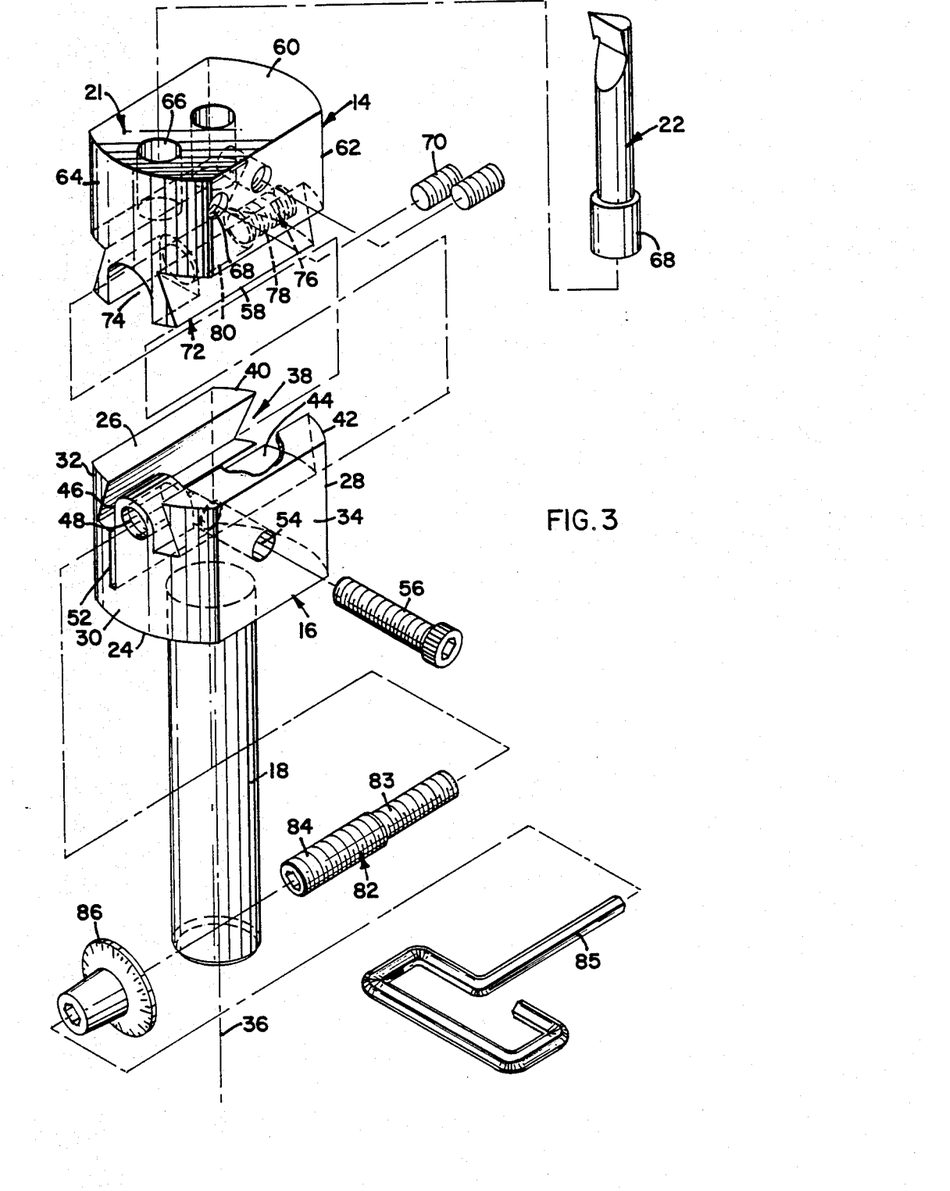
FIG. 3 is an exploded perspective view of the apparatus of FIG. 1, inverted with respect to FIG. 1.

As shown in FIG. 3, body 16 includes first and second ends 24 and 26, first and second opposite arcuate sides 28 and 30, and third and fourth opposite flat sides 32 and 34. The centerline of cylindrical shank 18 forms a first axis 36 for apparatus 10. A dovetail channel 38 is formed in first end 26 to extend from first side 28 to second side 30. Dovetail channel 38 is substantially perpendicular to axis 36.

Figure 4:
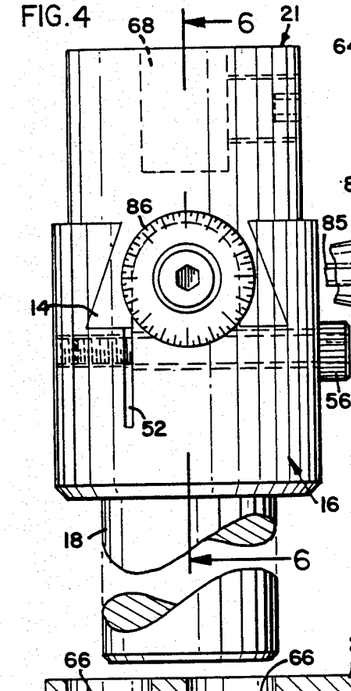
FIG. 4 is an end view.

Dovetail channel 38 has opposite first and second sidewalls 40 and 42 and a bottom 44. A partial wall 46 extends outwardly from bottom 44 and preferably as an extension of second side 30. Partial wall 46 has straight sides with a semi-cylindrical top. Partial wall 46 has thickness less than one half the distance between first and second sides 28 and 30. Partial wall 46 is preferably centered with respect to channel 38 and is spaced from each of first and second sidewalls 40 and 42. A first opening 48 is bored and threaded in partial wall 46. The centerline of opening 48 defines second axis 50 which preferably intersects and is perpendicular to first axis 36. A slot 52 extends from bottom 44 toward first end 24 preferably along a side of partial wall 46. Slot 52 is preferably parallel to third and fourth flat sides 32 and 34. A second opening 54 is bored through body 16 between third and fourth sides 32 and 34 and through slot 52. Opening 54 is threaded (see FIG. 4) on one side of slot 52 and is enlarged for clearance on the other side of slot 52. Headed screw 56 is received in opening 54 and when tightened functions to compress slot 52 together and side walls 40 and 42 against guide 72 of slide member 14.

Slide 14 has opposite third and fourth ends 58 and 60 and opposite arcuate fifth and sixth sides 62 and 64, which correspond to first and second sides 28 and 30 of body 16. Slide 14 includes in fourth end 60 mechanism 21 for receiving and holding cutting bar 22. Mechanism 21 includes an opening 66 in fourth end 60 for receiving end 68 of cutting bar 22. A threaded opening 68 perpendicular to opening 66 receives a set screw 70 for securing cutting bar 22 with respect to slide 14. In FIG. 3, a pair of spaced apart mechanisms 21 are shown thereby providing for a wider range of boring diameters possible with tool 10.

A guide 72 is formed in third end 58 of slide 14. Guide 72 extends the entire distance between fifth and sixth sides 62 and 64. Guide 72 is formed to mate with dovetail channel 38 in body 16. Guide 72 includes in sixth side 64 a cavity 74 for receiving partial wall 46. Cavity 74 extends less than half way through guide 58. Cavity 74 has straight sides and a semi-cylindrical top. Guide 58 further includes a third opening 76, which includes a threaded portion 78 and a clearance portion 80. Third opening 76 is aligned along second axis 50 when guide 72 is in dovetail channel 38.

Figure 5:
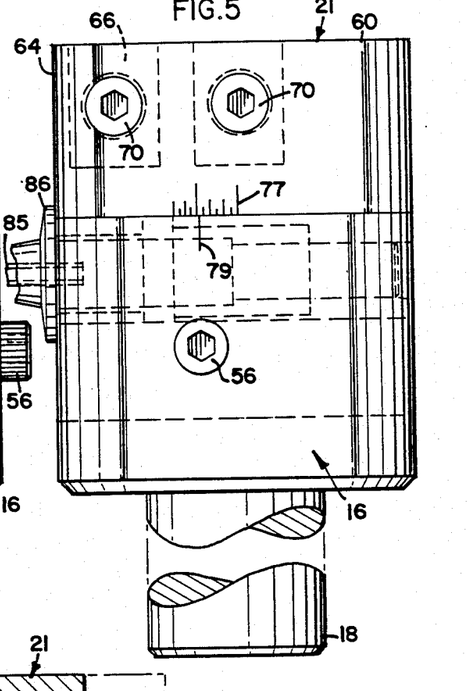
FIG. 5 is a side view.
Figure 6:
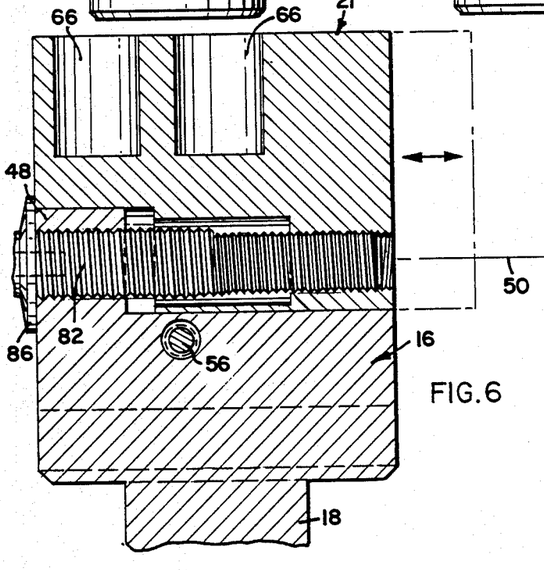
FIG. 6 is a cross-sectional view taken along line 6—6 of FIG. 4.

Threaded rod 82 threads into both threaded portion 78 of slide 14 and first threaded opening 48 in partial wall 46 of head 16. Preferably, threaded rod 82 has two different sets of threads 83 and 84 having different pitches. Threads 83 would mate with threaded portion 78 while threads 84 would mate with the threads in threaded opening 48. With such configuration, a complete rotation of threaded rod 82 with a tool 85 moves slide 14 only a distance which is a function of the difference of the pitches of the two sets of threads. In this way, a much finer adjustment of slide 14 with respect to body 16 is possible. A dial 86 fits on threaded rod 82 to provide calibration of the distance which the slide moves. Dial 86 is used in conjunction with indicia 77 and 79 (see FIG. 5) on slide 14 and body 16, respectively.

Figure 7:
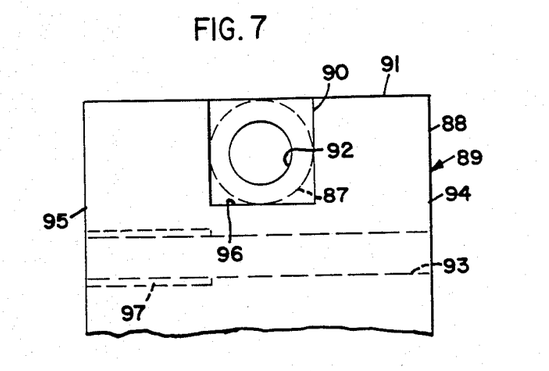
FIG. 7 is an end view of a first blank illustrating drilling and milling steps of the procedure for making apparatus in accordance with the present invention.

The procedure for making tool 10 includes fabricating the primary member and the slide and then assembling them and other parts together. To make the primary member 12 as illustrated in FIG. 7, a first hole 87 is drilled in the first side 88 of a first blank 89 to a location which is spaced from an opposite second side (not shown) thereby leaving a wall which will become partial wall 46. A first slot 90 is next milled in the second end 91 of first blank 89. First slot 90 is aligned on and extends along first hole 87 from first side 88 to the end of first hole 87 which is to become partial wall 46. First slot 90 has a depth to at least the lowermost portion of hole 87 with respect to end 91. As a further part of the procedure, a second hole 92 is drilled and tapped for first threads, preferably centered, in what is to become partial wall 46. The centerline of second hole 92 defines second axis 50. Also, a third hole 93 is drilled extending between third and fourth sides 94 and 95 of first blank 89 and located between the first bottom 96 of the first slot 90 and what will become the first end 24 of the body. A portion 97 of third hole 93 is tapped with threads. With respect to the drilling steps, it is understood that the various steps may be made in any order and that only the milling step needs to follow the step of drilling first hole 87. In this regard, it is noted that second hole 92 may be drilled before or after first hole 87. If second hole 92 is drilled before first hole 87, it is simply drilled through the entire width of first blank 89, rather than through only what is to become partial wall 46.

Figure 8:
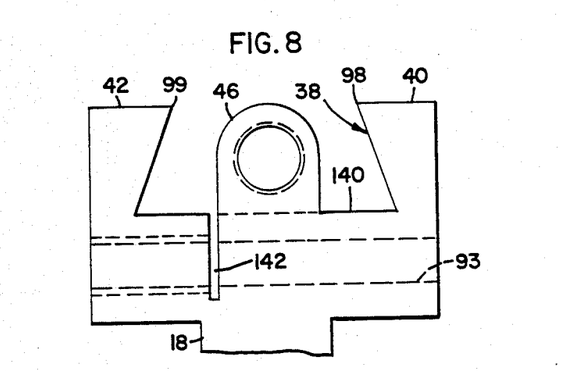
FIG. 8 is an end view of the first blank of FIG. 7 illustrating the first blank after machining with an electro-discharge machine.

After completing the above described drilling and milling steps, the first blank 87 is heat treated to enhance its hardness. After completing the heat treating, first slot 90 is enlarged to become dovetail channel 38 (see FIGS. 3 and 8). Channel 38 is preferably formed by using a conventional wire electro-discharge machine. In this regard, it is noted that the continuous wire may proceed from one dovetail corner 98 to the opposite dovetail corner 99 without running into any obstacles. With respect to forming channel 38, it is further noted that the bottom 140 of the dovetail is no deeper than the bottom 96 of first slot 90. It is noted further that the forming of the dovetail channel includes cutting a second slot 142 in the bottom of dovetail channel 38 on one side of what has now become partial wall 46. Second slot 142 extends in the direction of what will be the first end of body 16 to a location on the first end side of third hole 93. Second slot 142 provides a space which allows screw 56 to rigidify and compress the sidewalls 40 and 42 of dovetail channel 38 against guide 72.

The cylindrical shank 18, as adequately shown in FIGS. 1 and 3–6, is ground along the end portion of first blank 89 opposite second end 91. the wall which then divides shank 18 from body 16 becomes first end 24. The centerline of shank 18 defines axis 36. It is noted that shank 18 may be ground before dovetail channel 38 is formed with the electro-discharge machine. It is preferable, however, that shank 18 be ground after heat treating.

Figure 9:
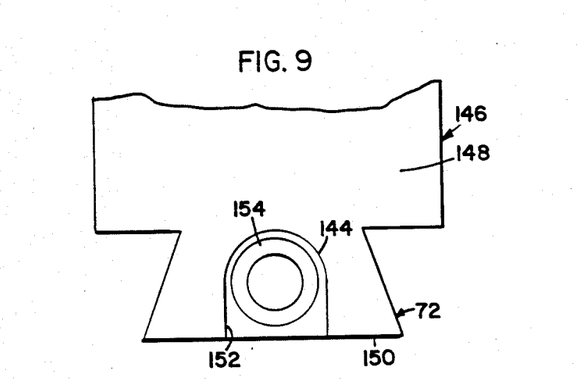
FIG. 9 is an end view of a second blank for illustrating the procedure of making a slide in accordance with the present invention.

A similar idea is incorporated in the process of making slide 14. That is, the critical surfaces of guide 72 are formed after heat treating. More particularly, as illustrated in FIG. 9, fourth hole 144 is drilled less than half way through second blank 146. Fourth hole 144 is drilled in side 148 near end 150 of second blank 146. After drilling fourth hole 144, third slot 152 is milled in third end 150 from side 148 to the end of fourth hole 144. Third slot 152 extends to a depth of approximately the diameter of fourth hole 144 which is parallel with end 150. A fifth hole 154 is then drilled and tapped. Fifth hole 154 is generally aligned with fourth hole 144 and is more closely aligned with second axis 50 when slide 14 is completed and fitted together with body 16. The mechanism 21 is then machined in the end opposite end 150 of second blank 146. As can be seen from FIG. 3, mechanism 21 is formed by drilling holes 66 and then drilling and tapping holes 68.

Again, it is understood that the various drilling operations may be made in any sequence. It is only the milling of third slot 152 which must follow the drilling of fourth hole 144.

After completing the various drilling and milling steps just described, second blank 146 is heat treated. After heat treating, guide 72 is formed in end 150 as a male dovetail to mate closely with the female channel of body 16. Preferably, guide 72 is formed using the wire electrodischarge machine so that extremely close tolerances may be maintained and various slides 14 and bodies 16 may be used interchangeably.

To use, a tool 10, is assembled. A guide 72, a slide 14 is inserted in a dovetail channel 38 of a body 16. A threaded rod 82 is then threaded into openings 48 and 76. Screw 56 is inserted and threaded into opening 54. Cutting bar 22 is inserted in one of openings 66 and held by the appropriate subscrew 70. The boring head 10 is then installed in usual fashion in a rotatable power source 20 or a stationary holding mechanism as the case may be.

To adjust boring head 10, slide 14 is positioned with respect to head 16 so that an appropriate line of indicia 77 aligns with index line 79. It is generally preferable to tighten screw 56 so that sidewalls 40 and 42 of channel 38 fit tightly against guide 72. Tool 85 is then used to turn threaded rod 82 and dial 86. A complete turn moves slide 14 a distance equal to the difference of the pictures of the two sets of threads of threaded rod 82. A partial turn moves the slide a lesser distance which is calibrated on dial 86. With the major markings of indicia 77 with respect to index mark 99 calibrated for specific boring hole diameters when shank 18 is rotated in a specific type of boring bar 22 is installed, any sliding adjustment of threaded rod 82 will result in a small common known movement of boring part 22 and, therefore, change in any old diameter to be bored. With the present structure made in accordance with the present procedure, it has been found that old diameters may be made consistently to tolerances less than 0.0001 inch. Such accuracy is generally over 100% better than prior art boring heads.

Although the details of structure and process of making the present invention have been set forth and the advantages discussed, the present disclosure is nevertheless exemplary. In this regard, it is understood, therefore, that changes made, especially in matters of shape, size and arrangement to the full extent extended by the general meaning of the terms in which the appended claims are expressed, are within the principle of the present invention.

What is claimed is:

1. Tool apparatus for holding a cutting bar for boring a hole, comprising:

a primary member including a body with opposite first and second ends, opposite first and second sides and opposite third and fourth sides, said primary member further including a shank extending away from the first end of said body, said body having a channel in the second end between the opposite first and second sides, said channel having a bottom and opposite first and second side walls, said channel further having a partial end wall;

a slide having opposite third and fourth ends, said slidd including in the fourth end means for receiving said cutting bar, said slide including in the third end a guide for fitting into said channel of said body;

means, within said channel extending between said partial end wall and said guide, for adjustably sliding said guide along said channel thereby controllably moving said slide with respect to said body, said adjustable sliding means includes a first threaded opening in the partial end wall of said body and a second threaded opening in the guide of said slide, said first and second threaded openings being aligned, said adjustable sliding means further including a threaded rod for threading into each of said first and second threaded openings, wherein turning of said threaded rod causes said slide to move controllably one of toward and away from said partial end wall of said body; and means, between the bottom of said channel and said first end of said body, for applying by each of said first and second side walls of said channel a compressive force against said guide.

2. Tool apparatus for holding a cutting bar for boring a hole, comprising:
a primary member including a body with opposite first and second ends, opposite first and second sides, and opposite third and fourth sides, said primary member further including a shank extending away from the first end of said body, said shank having a first centerline defining a first axis, said body having a dovetail substantially perpendicular to and substantially centered with respect to said first axis in the second end of said body between the opposite first and second sides, said dovetail having a bottom and first and second side walls, said dovetail further having a partial end wall with a first threaded opening having a second axis therethrough, said second axis being perpendicular to said first axis, said body also including a slot extending from the bottom of said channel toward said first end and extending between said first and second sides, said body further including a second opening extending between said third and fourth sides and through said slot, said second opening being threaded on one side of said slot;
a slide having opposite third and fourth ends and opposite fifth and sixth sides corresponding to said first and second sides of said body, said slide including in the fourth end means for receiving said cutting bar, said slide also including a guide in the third end extending between said fifth and sixth sides, said guide mating with said dovetail, said guide including in said sixth side a cavity for allowing said partial end wall to be received, said guide further including a third threaded opening, said third threaded opening being aligned along said second axis of said first threaded opening when said guide is in said dovetail;
a threaded rod for threading in said first and third threaded openings and moving said slide along opposite directions with respect to said body; and
a screw operably fitting in said second opening for compressing said first and second side walls towards one another to apply a compressive force against said guide.

* * * * *